United States Patent
Guo et al.

(10) Patent No.: US 11,379,649 B2
(45) Date of Patent: Jul. 5, 2022

(54) ADVANCED CELL-AWARE FAULT MODEL FOR YIELD ANALYSIS AND PHYSICAL FAILURE ANALYSIS

(71) Applicant: Synopsys, Inc., Mountain View, CA (US)

(72) Inventors: Ruifeng Guo, Portland, OR (US); Brian Archer, Mountain View, CA (US)

(73) Assignee: Synopsys, Inc., Mountain View, CA (US)

(*) Notice: Subject to any disclaimer, the term of this patent is extended or adjusted under 35 U.S.C. 154(b) by 2 days.

(21) Appl. No.: 17/159,017

(22) Filed: Jan. 26, 2021

(65) Prior Publication Data

US 2021/0240905 A1 Aug. 5, 2021

Related U.S. Application Data

(60) Provisional application No. 62/968,810, filed on Jan. 31, 2020.

(51) Int. Cl.
*G06F 30/398* (2020.01)
*G06F 30/3308* (2020.01)
*G06F 30/367* (2020.01)
*G06F 119/22* (2020.01)

(52) U.S. Cl.
CPC ........ *G06F 30/398* (2020.01); *G06F 30/3308* (2020.01); *G06F 30/367* (2020.01); *G06F 2119/22* (2020.01)

(58) Field of Classification Search
CPC .. G06F 30/398; G06F 30/3308; G06F 30/367; G06F 2119/22

USPC .......................... 716/112, 106, 136; 703/14
See application file for complete search history.

(56) References Cited

U.S. PATENT DOCUMENTS

| | | | |
|---|---|---|---|
| 10,990,721 B1* | 4/2021 | Reece | G06F 30/31 |
| 2012/0131527 A1* | 5/2012 | Kekare | H01L 22/20 |
| | | | 716/111 |
| 2018/0039721 A1* | 2/2018 | Guo | G06F 30/367 |
| 2020/0394352 A1* | 12/2020 | Amaru | G06F 30/31 |
| 2021/0342511 A1* | 11/2021 | Guo | G06F 30/3312 |

OTHER PUBLICATIONS

Devdas, "Fault Characterization and Testing of Digital Current Mode Logic Circuits", University of British Columbia, Canada, 1995, 126 pages. (Year: 1995).*
Chen et al., Chinese Patent Document No. CN-106682319-A, published May 17, 2017, frontpage and 1 drawing. (Year: 2017).*

* cited by examiner

*Primary Examiner* — Phallaka Kik
(74) *Attorney, Agent, or Firm* — Weaver Austin Villeneuve & Sampson LLP

(57) ABSTRACT

To specifically identify faults within a semiconductor cell, a SPICE netlist associated with the semiconductor cell design is retrieved, and one or more transistor characteristics are identified within the SPICE netlist. An advanced cell-aware fault model is executed for the semiconductor cell, and results are returned for one or more fault test methods of the advanced cell-aware fault model for a cell of the semiconductor chip design. A method for identifying faults within the semiconductor cell continues by correlating one more faults detected as a result of the fault test methods with one or more transistor characteristics within the SPICE netlist, and a user interface is generated for identifying one or more faulty transistors within the semiconductor chip design.

20 Claims, 6 Drawing Sheets

FIG. 2

Example:

Transistor_and_subcell_layout_data:
- [Table, Device]
- [Name, Type, llx, lly, urx, ury, layers, Active_Device, Related_Pin, device_model, device_feature]
- [XMPA1, transistor, 80, 432, 100, 432, pgate_mac tpdiff, XMPA1, , lvpfet, nfin_a_sdb2=3 angle=90]
- [XMNA1, transistor, 80, 144, 100, 144, ngate_mac tndiff, XMNA1, , lvnfet, nfin_a_sdb2=2 angle=90]
- [XMPA2, transistor, 170, 432, 190, 432, pgate_mac tpdiff, XMPA2, , lvpfet, nfin_a_sdb2=0 angle=90]

FIG. 3

ADVANCED CELL-AWARE FAULT MODEL FOR YIELD ANALYSIS AND PHYSICAL FAILURE ANALYSIS

RELATED APPLICATION

This patent application claims priority to U.S. Provisional Appl. Ser. No. 62/968,810, filed Jan. 31, 2020, which is incorporated herein by reference in its entirety.

TECHNICAL FIELD

The present disclosure relates to yield analysis concepts relating to semiconductor manufacturing.

BACKGROUND

With the advancement of the semiconductor manufacturing technologies, the transistor construction process is becoming more complex and transistor size is shrinking. Defects in transistors are becoming subtler and much harder to pinpoint for yield analysis engineers identifying yield limiting factors. These problems are becoming more prevalent as semiconductor technologies and transistor sizes continue to shrink, for example, to 5 nm technologies and below.

Defects in a transistor can impact the functionality or performance of the transistor. For example, some defects may cause a transistor to stay in an OFF state instead of toggling between 0 and 1; some other defects may cause excessive leakage and make the signal transition much slower than expected. For yield analysis and physical failure analysis, it has become an issue to quickly pinpoint the defect location and find the root cause of the transistor defects.

SUMMARY

A method is discussed herein comprising: identifying one or more transistor characteristics within a netlist associated with a semiconductor chip design; receiving results of one or more fault test models for a cell of the semiconductor chip design generated at one or more output pins of the cell of the semiconductor chip design based at least in part on inputs provided to input pins of the cell of the semiconductor chip design specified by the one or more fault test models and wherein the one or more fault test models are executed based at least in part on the one or more transistor characteristics within the netlist associated with the semiconductor chip design; correlating one or more faults detected with one or more transistor characteristics within the netlist based at least in part on the results of the one or more fault test models to identify one or more faulty transistors within the semiconductor chip design; and providing, by a processor, a user interface identifying the one or more faulty transistors within the semiconductor chip design.

In certain implementations of the method, identifying one or more transistor characteristics comprises: receiving user input of transistor characteristics of interest; identifying the transistor characteristics of interest within the netlist associated with the semiconductor chip design; and extracting the transistor characteristics of interest from the netlist associated with the semiconductor chip design. Moreover, providing a user interface may comprise providing data identifying a location of one or more faults within the cell of the semiconductor chip design within a graphical display overlaying the location of the one or more faults onto a cell layout.

The method may further comprise steps for generating at least one user interface uniquely identifying at least one transistor and one or more transistor characteristics for the at least one transistor identified within the netlist wherein the user interface uniquely identifying the at least one transistor comprises data uniquely identifying the at least one transistor extracted from the netlist and data identifying the one or more transistor characteristics extracted from the netlist. Correlating one or more faults detected with one or more transistor characteristics within the netlist may comprise looking up a result generated at the one or more output pins of the cell of the semiconductor chip design within a data structure identifying the expected output of the cell of the semiconductor chip design. In certain embodiments, identifying one or more transistor characteristics within a netlist associated with a semiconductor chip design comprises: identifying a library cell within the semiconductor chip design; and retrieving one or more transistor characteristics for the library cell from a memory storage area. The method may additionally comprise comparing one or more transistor characteristics of the one or more faulty transistors with one or more transistor characteristics extracted from the netlist associated with the semiconductor chip design for other transistors; determining whether one or more of the transistor characteristics of the one or more faulty transistors match one or more of the transistor characteristics for at least one of the other transistors; determining whether one or more faults detected for the one or more faulty transistors are shared with the at least one of the other transistors upon determining that at least one of the transistor characteristics of the one or more faulty transistors match at least one of the transistor characteristics for the at least one of the other transistors; and upon determining at least one of the one or more faults are shared with at least one of the other transistors, identifying the at least one of the other transistors as a faulty transistor within the user interface.

Additionally described are systems comprising a memory storing instructions and a processor, coupled with the memory and to execute the instructions, the instructions when executed cause the processor to: identify one or more transistor characteristics within a netlist associated with a semiconductor chip design; execute an advanced cell-aware fault model for the semiconductor chip design to provide inputs specified within one or more fault test models to input pins of a cell of the semiconductor chip design, wherein the one or more fault test models are identified based at least in part on the one or more transistor characteristics within the netlist associated with the semiconductor chip design and wherein providing the inputs to input pins of the cell causes the cell to generate results at one or more output pins of the cell; correlate one or more faults detected with one or more transistor characteristics within the netlist based at least in part on the results of the one or more fault test models to identify one or more faulty transistors within the semiconductor chip design; and provide a user interface identifying the one or more faulty transistors within the semiconductor chip design.

For certain implementations of the system, identifying one or more transistor characteristics comprises: receiving user input of transistor characteristics of interest; identifying the transistor characteristics of interest within the netlist associated with the semiconductor chip design; and extracting the transistor characteristics of interest from the netlist associated with the semiconductor chip design. In certain implementations, providing a user interface comprises providing data identifying a location of one or more faults within the cell of the semiconductor chip design within a graphical display overlaying the location of the one or more faults onto a cell layout. Moreover, the processor may be further configured to generate at least one user interface uniquely identifying at least one transistor and one or more transistor characteristics for the at least one transistor identified within the netlist wherein the user interface uniquely identifying the at least one transistor comprises data uniquely identifying the at least one transistor extracted from the netlist and data identifying the one or more transistor characteristics extracted from the netlist.

Correlating one or more faults detected with one or more transistor characteristics within the netlist may comprise looking up a result generated at the one or more output pins of the cell of the semiconductor chip design within a data structure identifying the expected output of the cell of the semiconductor chip design.

For certain systems, identifying one or more transistor characteristics within a netlist associated with a semiconductor chip design comprises: identifying a library cell within the semiconductor chip design; and retrieving one or more transistor characteristics for the library cell from a memory storage area. Moreover, the processor may be further configured to determine whether one or more faults detected for a semiconductor chip design are shared with a plurality of transistors within the semiconductor chip design.

Also discussed herein are non-transitory computer readable media comprising stored instructions, which when executed by a processor, cause the processor to: identify one or more transistor characteristics within a netlist associated with a semiconductor chip design; execute an advanced cell-aware fault model for the semiconductor chip design to provide inputs specified within one or more fault test models to input pins of a cell of the semiconductor chip design, wherein the one or more fault test models are identified based at least in part on the one or more transistor characteristics within the netlist associated with the semiconductor chip design and wherein providing the inputs to input pins of the cell causes the cell to generate results at one or more output pins of the cell; correlate one or more faults detected with one or more transistor characteristics within the netlist based at least in part on the results of the one or more fault test models to identify one or more faulty transistors within the semiconductor chip design; and provide a user interface identifying the one or more faulty transistors within the semiconductor chip design.

In certain implementations, identifying one or more transistor characteristics comprises: receiving user input of transistor characteristics of interest; identifying the transistor characteristics of interest within the netlist associated with the semiconductor chip design; and extracting the transistor characteristics of interest from the netlist associated with the semiconductor chip design. Providing a user interface may comprise providing data identifying a location of one or more faults within the cell of the semiconductor chip design within a graphical display overlaying the location of the one or more faults onto a cell layout.

Certain implementations of the non-transitory computer readable medium further comprise stored instructions, which when executed by a processor, cause the processor to generate at least one user interface uniquely identifying at least one transistor and one or more transistor characteristics for the at least one transistor identified within the netlist wherein the user interface uniquely identifying the at least one transistor comprises data uniquely identifying the at least one transistor extracted from the netlist and data identifying the one or more transistor characteristics extracted from the netlist. In certain implementations, correlating one or more faults detected with one or more transistor characteristics within the netlist comprises looking up a result generated at the one or more output pins of the cell of the semiconductor chip design within a data structure identifying the expected output of the cell of the semiconductor chip design. For certain implementations, identifying one or more transistor characteristics within a netlist associated with a semiconductor chip design comprises: identifying a library cell within the semiconductor chip design; and retrieving one or more transistor characteristics for the library cell from a memory storage area.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 2 illustrates an example SPICE netlist for a semiconductor chip design.

FIG. 3 illustrates parameters of an example fault test model.

DETAILED DESCRIPTION

Figure 1:
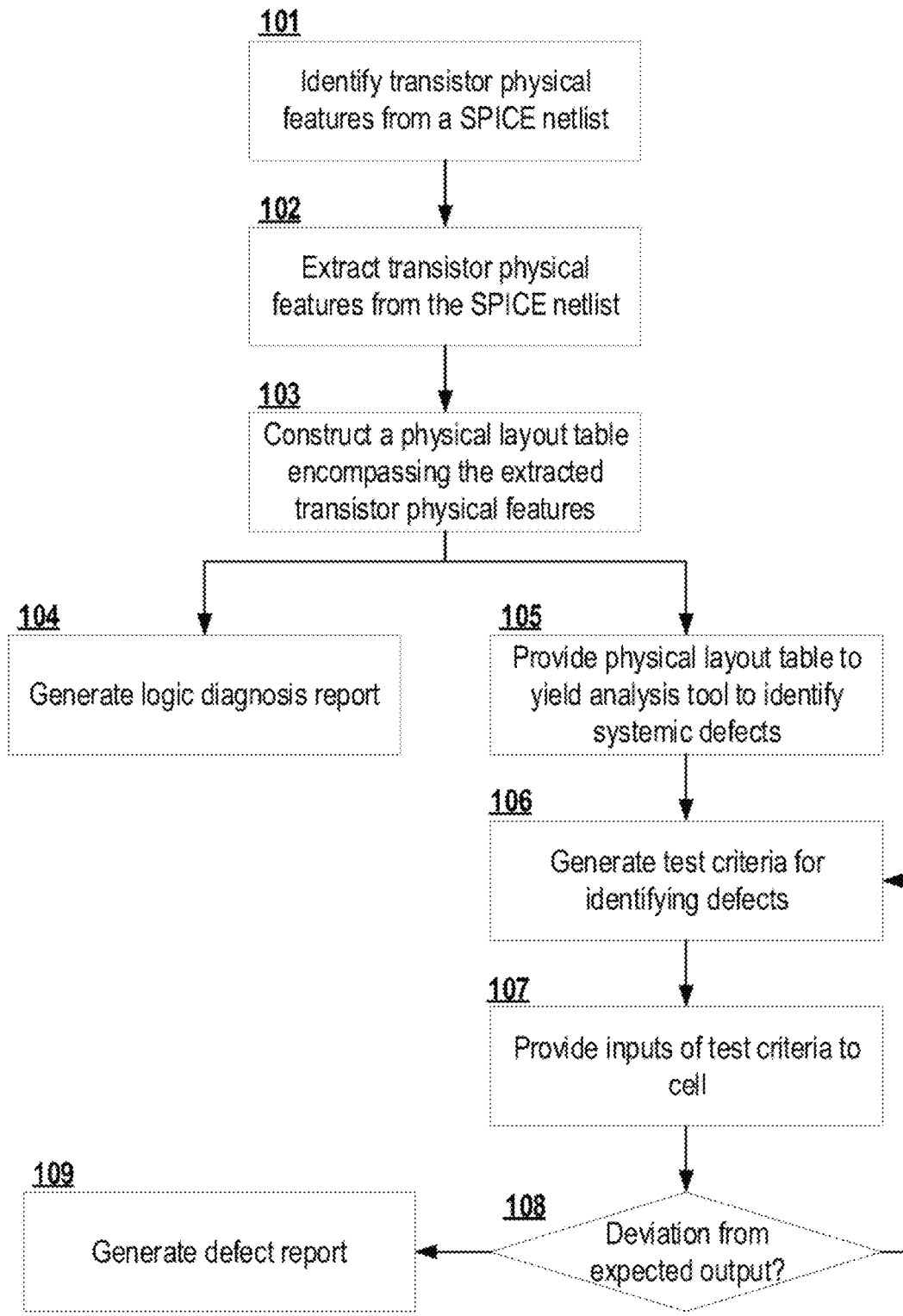
FIG. 1 is a flowchart illustrating example operation of an advanced cell-aware fault model.

Aspects of the present disclosure relate to advanced cell-aware fault models for yield analysis and physical failure analysis. The described aspects augment cell-aware fault modeling for semiconductor manufacturing with detailed transistor physical features that can be identified and extracted from a SPICE netlist. By utilizing data of detailed transistor physical features, the cell-aware fault modeling process predicts how a properly functioning cell should operate, as well as how a malfunctioning cell would operate for multiple potential malfunction types. The methodology thereby enables detection of faulty transistors within a physical semiconductor chip. The advanced cell-aware fault model shows its benefit of helping yield analysis and physical failure analysis engineers to quickly identify transistor defects that are yield limiting factors.

Discussed herein is an advanced cell-aware fault model 100 that considers physical features of transistors and a method of implementing the same. The advanced cell-aware fault model 100, when executed, identifies and extracts data indicative of characteristics of transistors within the cell design, such as physical features of the transistors within a cell design from SPICE netlists. The identified and extracted data enables the advanced cell-aware fault model 100 to predict how the cell should operate under proper functionality, and to predict how a specific malfunctioning transistor could impact the functionality of the overall cell design. The transistor characteristics for extraction may be identified based on user-specified data indicative of various parameters, based on automated configurations for identifying feature-specific data within SPICE netlists (e.g., based on generated data libraries and/or based on the results of machine-learning based analyses of data reflective of historical cell designs that are trained to identify defects within particular cells), and/or the like. The extracted data indicative of physical features of transistors is used in logic diagnosis to pinpoint a candidate defect as a particular transistor or a particular region within a cell design. Based on the physical features of diagnosis candidates, yield analysis and physical failure analysis, engineers can quickly identify the location and root cause of systematic defects that impact product yield. Thus, the use of the advanced cell-aware fault model 100 enables the identification and ultimate resolution of systemic defects within a cell, such as defects attributable to a single transistor, a single type of transistor (even if encompassing multiple individual transistors, or within a particular region of a cell, with a decreased usage of processing resources for defect analysis, as exhaustive testing criteria that may involve redundant or ineffective test strategies need not be executed to specifically identify those systemic defects. Moreover, because a less exhaustive testing criteria is required for a fault test model to accurately and precisely identify the root cause of defects within a cell, production yields may be increased over time, as the cell fault analysis requires less time for completion.

Many modern SOC (system-on-chip) designs are based on standard library cells. Faults within these standard library cells are often identified at cell boundary pins. For example, "stuck-at" fault models (e.g., identifying defects that do not permit a transistor to change output values) and "transition fault" models (e.g., identifying transition time faults) on the cell pins have detected most defects within library cells. However, with the ever-decreasing transistor size and ever-increasing standard library cell complexity, the detection of specific faults within a standard library cell based on boundary pin analysis is becoming more difficult.

Advanced cell-aware testing, which utilizes characteristics of the physical transistors within the standard library cell to generate fault test models provided to predict faulty behavior of an overall library cell based on a specifically malfunctioning transistor, may be utilized to identify and/or target defects inside standard library cells, even as the size of the library cells decrease and the complexity of those library cells increase. The cell-aware testing methodologies and models are generated with advanced cell-aware fault models. Once cell-aware fault models are generated, the cell-aware fault models can be used in fault test model generation processes to target defects inside complex cells.

An advanced cell-aware fault model 100 contains defect data indicative of the behavior of a specific defect within a library cell. The defect data includes identifying data that can be used to identify the specific defect to which the defect data applies. The defect data for a specific defect also identifies the standard library cell to which it applies, the transistor (or transistors) within the standard library cell to which it applies (e.g., based on data uniquely identifying the transistor (or transistors) as extracted from the SPICE netlist for the cell design), the type of defect for the transistor (or transistors), and data indicative of the behavior of the standard library cell when the specific transistor (or transistors) are malfunctioning in accordance with the identified defect type. For example, the defect data identifies the input pin values used to distinguish between a defect-free cell and a defect-impacted cell. The defect is simulated using a SPICE simulator and its behavior is captured and stored as a part of the defect data in a cell-aware fault model file. The stored defect data is utilized to generate fault test models, such as via input/output truth tables (for example, TestMax ATPG tool from Synopsys) to generate test patterns that target the defect behavior (e.g., by generating pin input combinations that can be utilized to distinguish between properly and improperly functioning transistors). These fault test models are implemented by providing input to the input pins of a cell consistent with the input-output truth table, and the results of the fault test model are received at the output pins of the cell, which can be compared against the expected results within the identified input-output truth table to identify a root cause of a defect. The defect data also guides the logic diagnosis tool (e.g. TestMax Diagnosis) to diagnose a failed chip by identifying the type of defect, as well as the location of the defect within a failed chip. The location of a defect may be specified via a generated graphical display, such as the example graphical display 402 reflected in FIG. 4 and discussed in greater detail herein.

Aspects of this disclosure relate to advanced cell-aware fault models 100 that identify and describe transistor defects inside standard library cells thereby enabling rectification of systemic defects within cells that decrease fabrication yields with minimal processing-resource utilization for testing cells and identifying defects. The cell-aware fault model 100 contains transistor characteristics identifying detailed transistor physical features that are correlated with specific defects, with such a correlation reflected within input-output truth tables for a standard library cell that distinguish between properly functioning and improperly functioning cell designs, and for distinguishing between defect locations within improperly functioning cell designs. These physical features can be identified and extracted from the SPICE netlist description of the library cells, such as through text-based extraction techniques for identifying relevant text and for extracting the relevant text for SPICE netlists that are reflected as text-files. The detailed transistor physical features reflected in the advanced cell-aware fault model 100 are used in the logic diagnosis (e.g., TestMax Diagnosis from Synopsys), and are effective to identify the root cause of a defect within an identified defective cell.

Semiconductor manufacturing technologies have been progressing from planar FET (field effect transistor), to FinFET, and now to gate-all-around (GAA) FET or MBCFET (multi-bridge channel field effect transistor) at 5 nm and below. The transistor constructions are becoming more complicated with the advancement of each generation of technology. Defects related to transistors have impacted the functionality, the drive strength, or leakage of the transistors.

During technology development or product yield ramp-up, manufacturers or fabless design houses need to quickly identify the yield limiting factors of a cell design. Logic diagnosis based on fault models may facilitate defect localization for yield analysis and physical analysis. Certain fault models may include stuck-at fault model and transition fault model.

An advanced cell-aware fault model 100 of certain embodiments contains defect data indicative of the behavior of a defect. For example, the defect data for a particular defect contains input pin values that distinguish between the different responses between a defect-free cell and a defect-impacted cell. The captured defect behavior are utilized for fault test model generation to generate test patterns that precisely target defect behavior and/or to diagnose a failed chip, such as by supplementing data utilized by a logic diagnosis tool (e.g., TestMax Diagnosis, by Synopsys).

Advanced cell-aware fault models 100 include defect data such as characteristics of physical information of a cell defect. For example, the advanced cell-aware fault model 100 generates data defining a bounding box around the defect (the bounding box is reflected visually via a graphical display, such as the example graphical display 402 reflected in FIG. 4), as well as data identifying the layer of the defect so as to pinpoint the location of the defect within the cell. An advanced cell-aware fault model 100 augments the transistor characteristics of an identified cell defect with detailed physical features of transistors extracted from the SPICE netlist for the cell. The extracted physical features are used in logic diagnosis reports, and/or are fed to yield analysis tools to quickly identify yield limiting factors as discussed herein.

Figure 2:
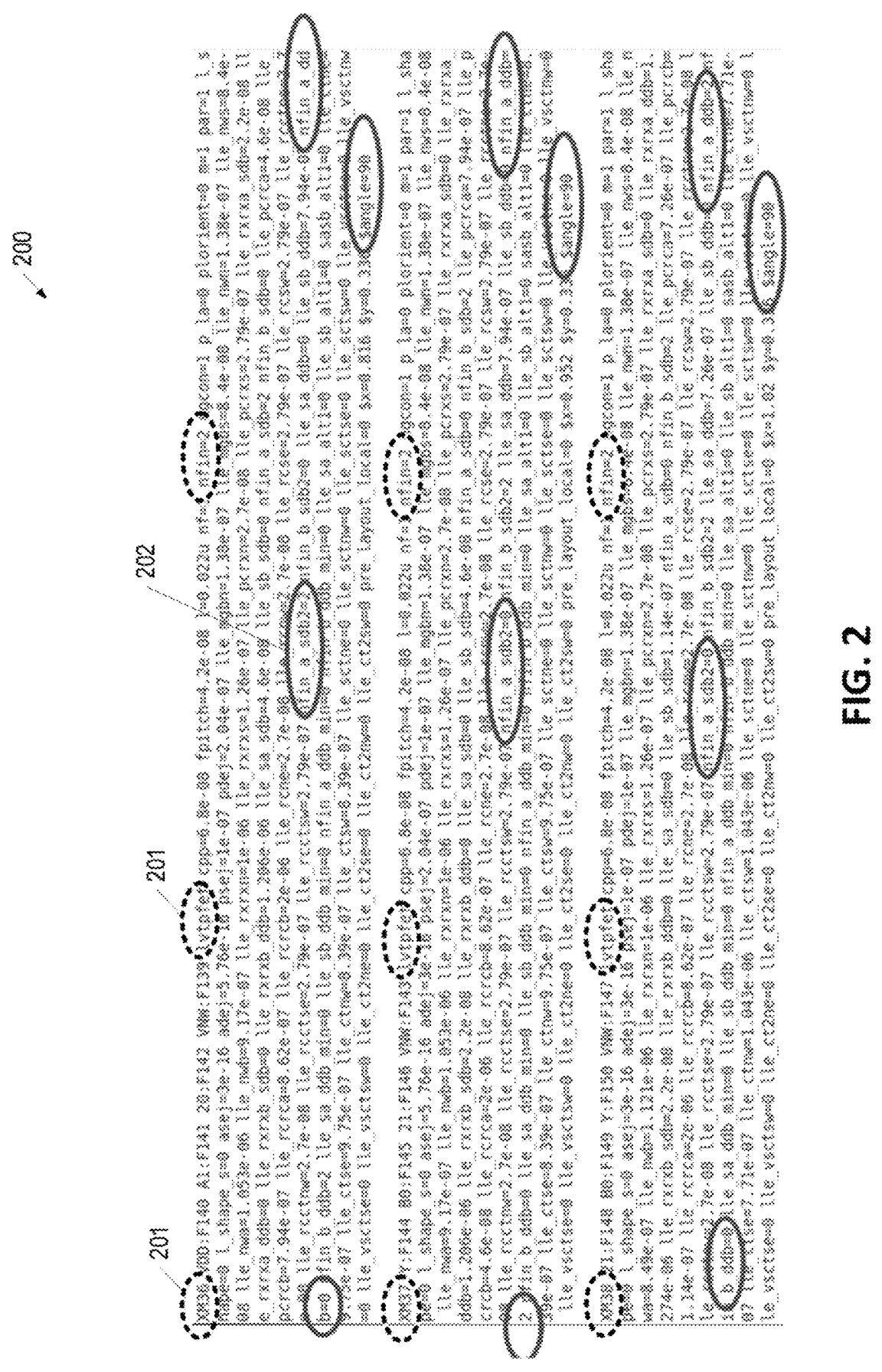

FIG. 1 illustrates an example flowchart showing steps of constructing and executing an example advanced cell-aware fault model 100. The advanced cell-aware fault model 100 identifies and extracts the transistor physical features from a SPICE netlist as indicated at Blocks 101-102 of FIG. 1 (an example SPICE netlist 200 is reflected in FIG. 2). Data indicative of the transistor physical features may be identified and extracted based at least in part on user input identifying particular parameters of interest and/or automatically-identified parameters (e.g., generated via a computing system based at least in part on an analysis of various SPICE netlists, and/or the like). In addition to identifying specific parameters for each transistor, data extraction additionally identifies and extracts data that uniquely identifies each transistor (e.g., such as a location of the transistor within the cell and the SPICE netlist or some other data that uniquely distinguishes each transistor from others within the cell and as reflected within the SPICE netlist). As just one example, data extracted from the SPICE netlist may be automatically identified as being relevant to identify certain defects within a cell. The SPICE netlists may be provided as text files (e.g., as shown in the example of FIG. 2), and the extraction of these features may include textual identification and extraction of text strings reflected within the SPICE netlist that are identified as relevant for uniquely identifying particular transistors during later analysis and/or that are identified as relevant for defect identification within a cell. The SPICE netlist contains, for each transistor instance, data identifying the transistor instance, as well as a list of parameters relevant for the transistor instance and their corresponding values. These parameters are related to physical features of each transistor instance in the cell layout. Different instances of transistors of the same type may have the same value for some parameters, but they may have different values for other parameters. The difference in values shows different physical characteristics of each individual transistor, which impacts the functionality of the transistors within a cell layout. An example of data content of a SPICE netlist is reflected in the figures, with individual parameters emphasized therein. With reference to FIG. 2, which illustrates a snippet of a SPICE netlist 200 for three transistor instances, data uniquely identifying each transistor instance is identified (circled with dashed lines denoted as 201 in the illustration of FIG. 2) and extracted, and individual parameters determined to be relevant for defect detection (e.g., based on manual identification and/or automatically identified) are similarly identified (circled with the solid lines denoted as 202 in the illustration of FIG. 2) and extracted. As just one example, text-based data identification and extraction proceeds by the advanced cell-aware fault model identifying particular text strings reflected within a memory storage area associated with the advanced cell-aware fault model 100 as being relevant for uniquely identifying a particular transistor and/or for distinguishing between defects. Relevant text strings within the SPICE netlist, as well as adjacent text (e.g., a defined number of characters or text between an identified relevant text string and a delimiter within the text) indicative of values associated with those relevant text strings are extracted for further analysis.

Below is an example description of a few transistors in a SPICE netlist file (example data is also shown in FIG. 2):
XMPA1 I1:F1109 A1:F1108 VDD:F1107 VBP pch_svt_mac ad=0.00203p as=0.00406p
+dfm_flag=1 edgeflag=0 1=0.02u matchingflag=0 nfin=2 nrd=0 nrs=0 ojh=0
+pd=0.128u ploda1=2e-08 ploda2=0 ploda3=0 plodb1=0 plodb2=0 plodb3=0
+ . . .
+spobl1=3.26e-07 spobl2=1.39e-07 spobr1=1.39e-07 spobr2=3.26e-07 nfin_a_ddb=1
nfin_b_ddb=0
+spot=4.3e-08 spotl1=4.3e-08 spotl2=4.3e-08 spotr1=4.3e-08 spotr2=4.3e-08
nfin_a_sdb2=3 nfin_b_sdb2=2 $angle=90
XMPA2 I1:F1109 A2:F1112 VDD:F1113 VBP pch_svt_mac ad=0.00203p as=0.00406p
+dfm_flag=1 edgeflag=0 1=0.02u matchingflag=0 nfin=2 nrd=0 nrs=0 ojh=0
+pd=0.128u ploda1=0 ploda2=0 ploda3=0 plodb1=2e-08 plodb2=0 plodb3=0
+ . . .
+spob=3.26e-07 spobl1=1.39e-07 spobl2=1.39e-07 spobr1=3.26e-07 nfin_a_ddb=0
nfin_b_ddb=1
+spobr2=1.39e-07 spot=4.3e-08 spotl1=4.3e-08 spotl2=4.3e-08 spotr1=4.3e-08
+spotr2=4.3e-08 nfin_a_sdb2=3 nfin_b_sdb2=3 $angle=90
XMPI1 X:F1115 I1:F1116 VDD:F1117 VBP pch_svt_mac ad=0.01078p as=0.01078p
+dfm_flag=1 edgeflag=0 1=0.02u matchingflag=0 nfin=4 nrd=0 nrs=0 ojh=0
+pd=0.448u ploda1=0 ploda2=0 ploda3=0 plodb1=0 plodb2=0 plodb3=0 ppitch=0
+ . . .
+sodxb4=5.92454e-08 sodyb=1.34e-07 sodyt=1.70115e-07 spob=3.26e-07
nfin_a_ddb=0 nfin_b_ddb=0
+spobl1=4.3e-08 spobl2=3.26e-07 spobr1=4.3e-08 spobr2=4.3e-08 spot=4.3e-08
+spotl1=4.3e-08 spotl2=4.3e-08 spotr1=4.3e-08 spotr2=4.3e-08 nfin_a_sdb2=3
nfin_b_sdb2=2 $angle=90

In the above example, there are three transistors of the same type "pch_svt_mac". For parameter "nfin" (which specifies the number of fins per metal gate finger of the transistor and which varies between transistors), the transistors have values 2, 2 and 4 respectively; thereby reflecting just one example parameter that varies between transistors and which, in the illustrated example, is determined to be indicative of the presence of defects within the operation of a transistor). Differences in the nfin parameter between transistors cause the transistors to operate differently under certain conditions, and thus these differences may be utilized by the advanced cell-aware fault model 100 as just one of multiple parameters that are reflective of differences in transistor characteristics that cause different fault behaviors of a cell based on which transistor is defective. The different values for the nfin parameter represent different physical characteristics of each of these transistors. For another parameter "angle" (which is also indicated as relevant for a fault test model to determine the presence of a defect in a cell as reflected the illustrated example SPICE netlist 200 of FIG. 2), all three transistors have the same value 90. Note that there are several parameters in the transistor description of the SPICE netlist, although certain parameters may be irrelevant for precisely identifying the root cause of a defect within a cell, and therefore the advanced cell-aware fault model 100 identifies and extracts only those parameters relevant for distinguishing between defect types, so as to minimize processing resources required for analyzing all parameters known for all transistors within a cell. Each parameter shows different aspects of the physical layout. By examining these parameters, embodiments select and extract transistor characteristics, for example, the transistor models, parameters and their values deemed relevant for distinguishing between defect types and/or defect locations within a cell. These extracted transistor characteristics may be utilized to construct fault test models to distinguish between properly functioning and malfunctioning transistors within a cell. It should be understood that certain parameters may be deemed relevant for identifying defect locations within one library cell design, but may not be relevant for identifying defect locations within another library cell design. As an example, identifying and extracting transistor characteristics deemed relevant for defect identification and localization may be a two-step process:

Step 1: Identify the transistor characteristics (reflected at Block 101 of FIG. 1). An advanced cell-aware fault model 100 encompasses a generation tool to identify and extract relevant transistor characteristics automatically. These transistor characteristics are identified as relevant and extracted for individual transistors within a cell to be analyzed for potential faults and/or yield-limiting factors. The advanced cell-aware fault model's 100 generation tool extracts specific transistor characteristics that are manually identified by a user and/or the advanced cell-aware fault model's 100 generation tool extracts specific transistor characteristics that are automatically identified as being relevant to distinguishing between a properly functioning and a malfunctioning transistor, such as based on a library of data correlating specific transistor characteristics with defect identification. If a user knows which transistor characteristics are of interest, the user can input these characteristics (e.g., via user input) to the advanced cell-aware fault model 100 for use by the generation tool, and the generation tool then focuses on the user specified transistor characteristics. In many cases, a user may not know the exact transistor characteristics of interest, or there may be too many parameters in the SPICE netlist for the user to manually select specific transistor characteristics of interest. In this situation, the cell-aware fault test model generation tool surveys all the transistors in the SPICE netlist files and compares the parameters and their values for all the transistors. These parameters can be classified or grouped based on whether all transistors of the same type have the same value or different values. The similarity (or non-similarity) of these physical feature values can be used to enhance the cell-aware fault model.

Step 2: Extract the physical features and create the physical feature data structure (e.g., a data table) to be included in the cell-aware fault test model file (reflected within Block 102 of FIG. 1). Once the physical features are identified (or specified by a user), the cell-aware fault test model generation tool extracts the parameters and their corresponding values and adds this information into the cell-aware fault model file. A physical layout data structure is then constructed to contain the characteristics indicative of physical data of all the transistors as reflected at Block 103. The enhanced cell-aware fault model 100 then generates a logic diagnosis report in certain instances (as shown at Block 104) providing an indication of whether the identified parameters are indicative of a potential defect (e.g., based on a comparison with a library of data utilized to identify defects of the advanced cell-aware fault model), and/or provides the generated physical layout data structure to a yield analysis tool to identify systematic defects within the cell as reflected at Block 105. For example, when utilizing the physical layout data structure via a yield analysis tool, the enhanced cell-aware fault model 100 generates one or more cell input-output truth tables to be utilized as test criteria of a fault test model that precisely identify potential defects within a cell based at least in part on the physical layout data structure (as reflected within Block 106 of FIG. 1). Because the physical characteristics of transistors dictate how the transistor will react to specific inputs, the enhanced cell-aware fault model 100 predicts how individual faulty transistors influence the operation of even a complex cell based on the physical characteristics of the individual transistors as reflected within the input-output truth tables generated and utilized as test criteria of a fault test model. Thus, the truth table specifies expected outputs (detectable at cell output pins) for a given set of inputs (provided at cell input pins). For example, for a given input to the overall cell, the advanced cell-aware fault model 100 predicts how that input will flow as signals through and between the various components (e.g., transistors) of the cell (e.g., as signals flowing from one transistor to another, as input for a first transistor becomes an output of the first transistor that is used as input for a second transistor) for a normally functioning cell. The advanced cell aware fault model 100 provides the inputs of the input-output truth tables to a cell as a part of a fault test model, as indicated at Block 107, and monitors the outputs of the cell based on inputs provided in accordance with the test criteria of the fault test model and input-output truth tables, as reflected within Block 108. Upon identifying a deviation from an expected output for a given cell, the advanced cell-aware fault model 100 identifies a defect within the cell, such by generating a defect report including an identification of the defect, as reflected at Block 109. The specific defect is identified with precision so as to indicate an area within the cell (e.g., at a specific transistor location), thereby enabling downstream processes and/or cell designers utilizing the advanced cell aware fault model to remediate the identified default. Moreover, as reflected herein, the defect report may include a graphical display providing a visual overlay on a displayed indication of a cell layout, such that users are provided with a visual indication of the location of the defect within the cell layout. In certain embodiments, the graphical display may be interactive, enabling a user to selectively zoom in/out of the layout to obtain additional detail about the location of the detected defect. Because the truth tables are specifically generated for identifying certain faults, the advanced cell aware fault model 100 need not execute an exhaustive test of all possible inputs to the cell to identify a specific source of a defect, thereby reducing the amount of processing resources necessary for defect identification. Similarly, utilizing the precisely tailored truth tables provided specifically for identifying particular faults within a library cell, the precise location of a fault within a cell may be identified with accuracy without requiring individual analysis of each transistor within a cell to determine the location of a fault with certainty. Specific information about the defect is determined and included within the defect report by identifying similarities between the defect for a particular cell and defects detected for other cells that share one or more physical characteristics (e.g., portions of a transistor layout for a cell). For example, based on determined similarities between defects detected for different cells and/or for defects detected for different input combinations for a single cell, the advanced cell-aware fault model 100 correlates specific defects to specific physical characteristics of a cell, thereby providing a specific indication of a particular faulty portion of a cell.

Based on the predicted outputs for various library cell designs and determined similarities between cell designs and detected defects, the cell input-output truth tables identify pin inputs for test criteria of a fault test model of the cell that distinguish between a properly functioning cell and an improperly functioning cell, with specific combinations of inputs within a test criteria of a fault test model utilized to distinguish between specific fault types. As a simplified example, the input-output truth table for a fault test model may specify that an input of "1" on a first input pin should result in an output of "1" on a first output pin. If a tested cell results in an output of "0" on the first output pin, this output may be indicative of a fault. A combination of multiple input-output combinations is then utilized to specifically identify the source of the fault and thereby distinguish between multiple potential faults to identify a specific fault type of the cell, which is then reflected within the defect report. Following the above example, having identified the presence of a fault in the cell (based on the incorrect output on the first output pin), the input-output table is referenced to specify that an input of "0" on a second input pin as a part of the test criteria of a fault test model, with a corresponding expected output of "0" on a second output pin for a first fault type, and an expected output of "1" on the same second output pin for a second fault type. As additional combinations of expected inputs and outputs are considered, the advanced cell-aware fault model 100 is capable of distinguishing between a plurality of fault types within a complex cell, thereby enabling the advanced cell-aware fault model to specifically identify a faulty transistor within a complex cell and to reflect the specifically identified faulty transistor (e.g., via the data uniquely identifying the faulty transistor extracted from the SPICE netlist) within the defect report.

As mentioned above, the extracted physical information can be provided in a data structure having a table format, for example, within a table of the cell-aware fault model file. The following shows an example cell-aware fault model 100 with physical features extracted from the SPICE netlist (such data is also represented by the example depicted in FIG. 3):

Transistor and Subcell Layout Data:
   [Table, Device]
   [Name, Type, llx, lly, urx, ury, layers, Active_Device, Related_Pin, device_model, device_feature]
   [XMPA1, transistor, 80, 432, 100, 432, pgate_mac tpdiff, XMPA1, pch_svt_mac, nfin=2 nfin_b_sdb2=2 angle=90]
   [XMPA2, transistor, 170, 432, 190, 432, pgate_mac tpdiff, XMPA2, pch_svt_mac, nfin=2 nfin_b_sdb2=3 angle=90]
   [XMPI1, transistor, 80, 144, 100, 144, ngate_mac tndiff, XMPI1, pch_svt_mac, nfin=4 nfin_b_sdb2=2 angle=90]

In the above example, the first row shows the physical features extracted by the advanced cell-aware fault model's 100 generation tool, and each succeeding row shows the feature values for each transistor. Each column corresponds to a physical feature of a transistor, for example, the column "device_model" show the type of transistors, and the column "device_feature" show the physical features (e.g. number of fins, the transistor angle, etc.) of each transistor. The data in this data structure can later be included in a logic diagnosis report, or to be imported to a yield analysis tool to identify defects within a cell.

In certain embodiments, the extracted data may be utilized to identify similarities (or non-similarities) between transistors included within a design. For example, upon identifying an error or fault within a design such as attributable to a faulty transistor, identifying similarities and/or non-similarities between transistors comprises determining whether one or more transistor characteristics match across multiple transistors (e.g., one or more parameters are shared between multiple transistors). The identified similarities and/or non-similarities between transistor parameters may be utilized to determine whether the identified fault is shared among all transistors having a given parameter, or whether the fault is isolated to a single transistor (or a plurality of unrelated transistors). For example, a particular fault may be indicated as being caused by a particular transistor parameter (or a specific combination of transistor parameters), such that a determination of whether a particular fault is shared among a plurality of parameters includes an identification of all other transistors sharing parameters with a faulty transistor identified as being correlated with the transistor fault. When displaying the faulty transistors within a graphical display, the graphical display is then updated to reflect the location (and/or other characteristics) of those transistors identified as sharing parameters with an initially identified faulty transistor.

Figure 4:
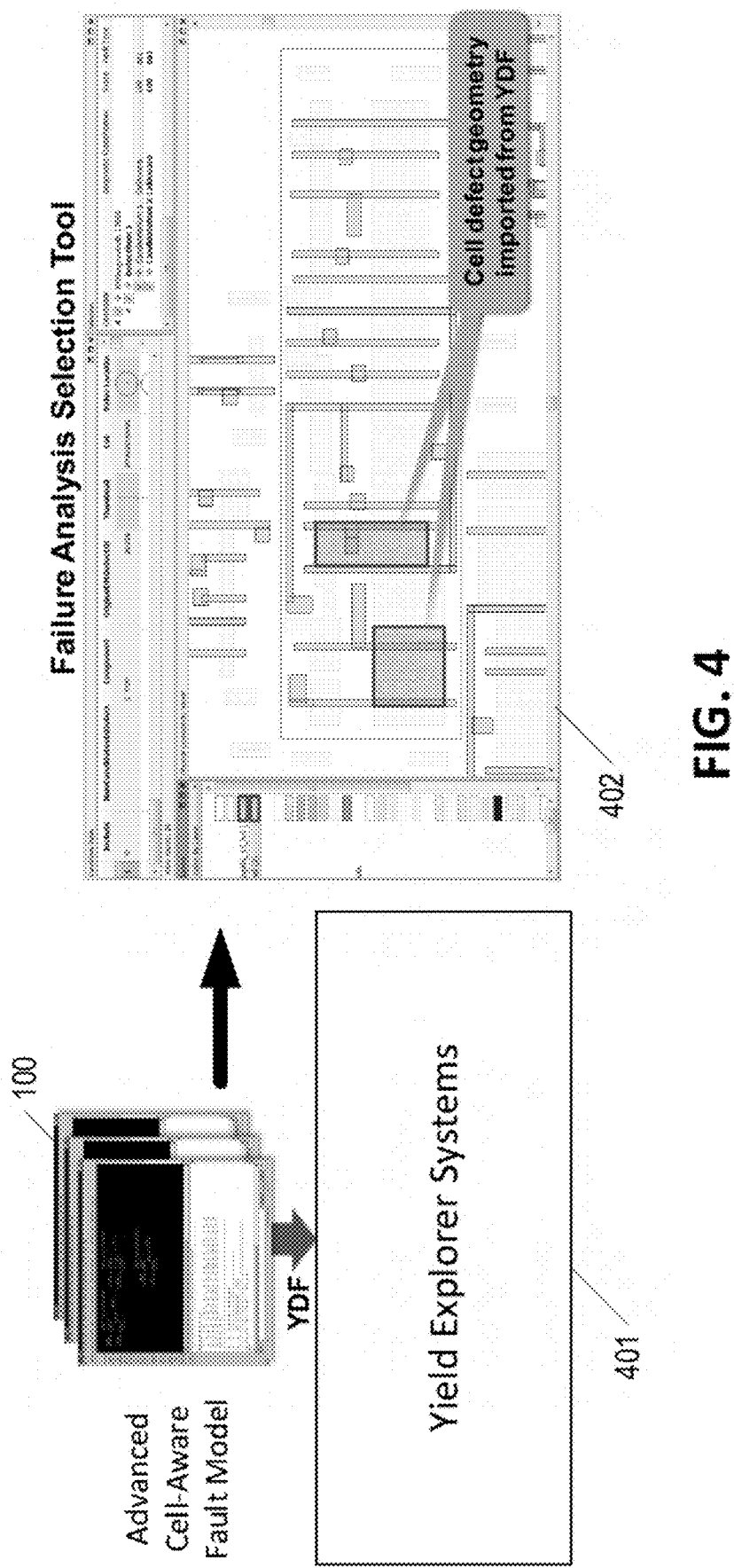
FIG. 4 illustrates example user interfaces for providing information regarding detected faults within a semiconductor cell.

Moreover, data indicative of the various transistor parameters may be shared with diagnostics and/or yield explorer systems 401 as reflected in FIG. 4 (e.g., executing via shared processing resources and/or via a separate computing entity) that may provide additional data regarding yields and/or detected faults within cells, such that the additional transistor parameters may supplement data provided via such systems (e.g., as reflected in FIG. 4) and such that the yield analysis may be utilized to reflect improved yields resulting from implementation of the advanced cell-aware fault modelling. In certain embodiments, these additional systems may be configured to utilize data indicative of the various physical parameters to modify displayed outputs (e.g., by illustrating identified similar transistors within a graphical display, by annotating displayed transistors within a display, and/or the like). An example graphical display is shown at FIG. 4, which illustrates graphical overlays indicative of the location of various defaults detected through application of the advanced cell aware fault model within a graphical illustration of a cell layout.

The advanced cell-aware fault model 100 may be utilized as a part of an overall cell design and fabrication process. For example, after construction of a netlist for a new cell design, the advanced cell-aware fault model identifies and extracts transistor characteristic data for transistors within the cell design (e.g., all transistors within the cell design). Based on the physical characteristics of transistors as identified within the transistor characteristic data, the advanced cell-aware fault model generates input-output data tables or other such data structures identifying how specific transistors, if faulty, impact the operation of the overall cell. The advanced cell-aware fault model identifies specific input combinations within the input-output data table that may be utilized to distinguish between normally functioning cells and malfunctioning cells as well as for distinguishing between fault types within the cell, which enables the advanced cell-aware fault model to specifically identify individual faulty transistors within a constructed cell.

During testing of a constructed cell (e.g., after fabrication) and/or when modelling the anticipated operation of a cell, the advanced cell-aware fault model 100 executes one or more fault test models comprising specifically identified combinations of inputs to the cell to determine whether the cell is functioning properly, and to distinguish between various fault types so as to enable the advanced cell-aware fault model to specifically identify faulty transistors within the fabricated (or simulated) cell.

By executing the one or more fault test models, the advanced cell-aware fault model 100 causes the cell to generate outputs at output pins of the cell. The advanced cell-aware fault model 100 then compares the generated output with data stored within the input-output data table for the utilized data inputs to look up whether the output of the fault test model is indicative of a faulty transistor, and to determine which transistor (or transistors) within the cell are faulty by correlating the output received from the cell for a given set of inputs to a corresponding entry within the input-output data table that identifies the specific fault of the cell.

The input-output data table may be generated separately for each semiconductor chip design. For example, an input-output table may be generated for each cell within a semiconductor chip design as a part of the semiconductor chip design process. However, input-output data tables for standard library cells may be stored in a memory for retrieval when constructing fault test models for a newly developed semiconductor chip design that includes one or more standard library cells. During design of the semiconductor chip, standard library cells included within the semiconductor chip design are identified, and the advanced cell-aware fault model retrieves relevant input-output data tables for the standard library cells, and subsequently utilizes the retrieved input-output data tables during testing of the semiconductor cell design.

Figure 5:
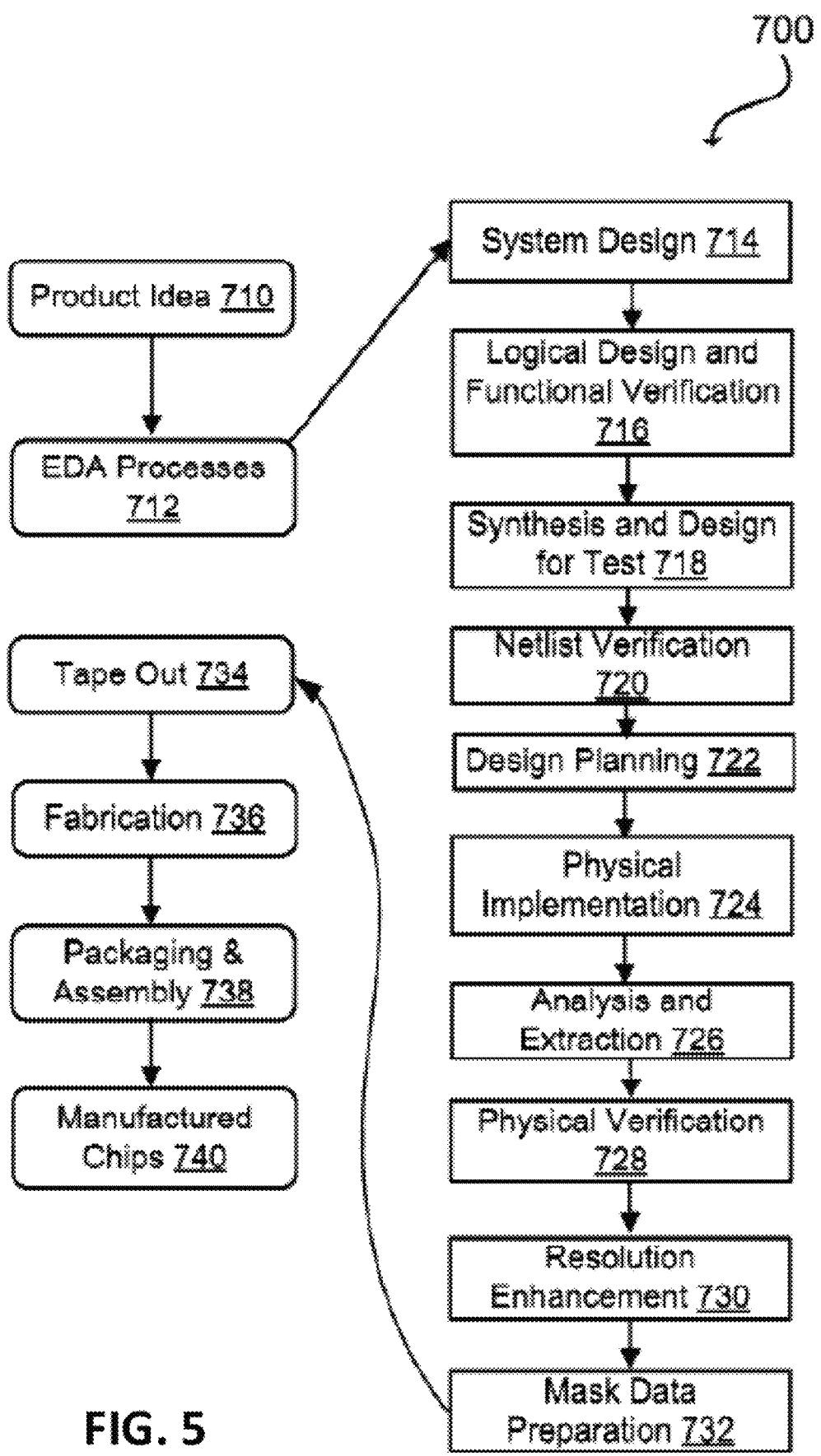
FIG. 5 depicts a flowchart of various processes used during the design and manufacture of an integrated circuit in accordance with some embodiments of the present disclosure.

FIG. 5 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for development of cells for the library and for physical and logical design that use the library.

Figure 6:
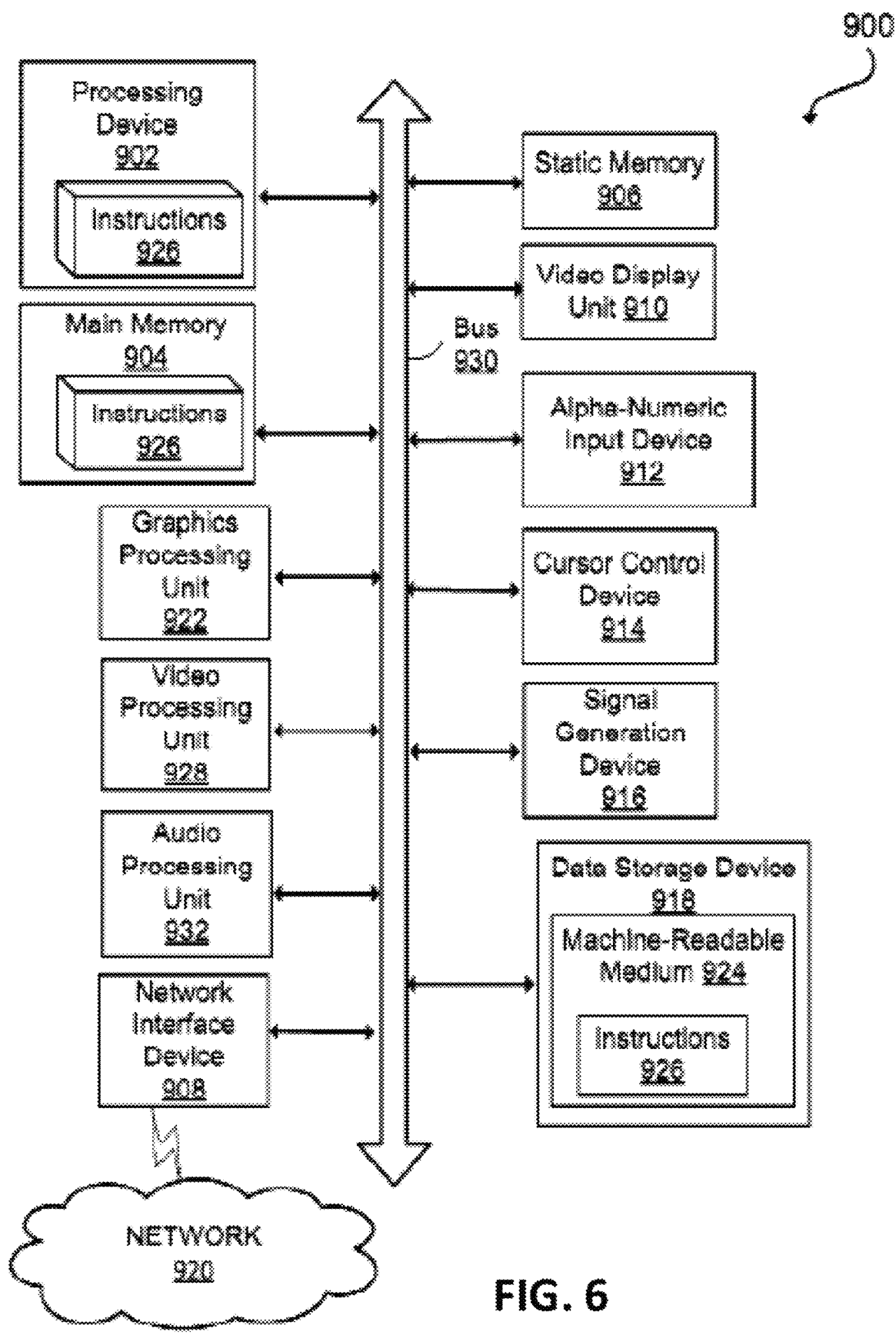
FIG. 6 depicts an abstract diagram of an example computer system in which embodiments of the present disclosure may operate.

FIG. 6 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   identifying one or more transistor characteristics within a netlist associated with a semiconductor chip design;
   receiving results of one or more fault test models for a cell of the semiconductor chip design generated at one or more output pins of the cell of the semiconductor chip design based at least in part on inputs provided to input pins of the cell of the semiconductor chip design specified by the one or more fault test models and wherein the one or more fault test models are executed based at least in part on the one or more transistor characteristics within the netlist associated with the semiconductor chip design;
   correlating one or more faults detected with one or more transistor characteristics within the netlist based at least in part on the results of the one or more fault test models to identify one or more faulty transistors within the semiconductor chip design; and
   providing, by a processor, a user interface identifying the one or more faulty transistors within the semiconductor chip design.

2. The method of claim 1, wherein identifying one or more transistor characteristics comprises:
   receiving user input of transistor characteristics of interest;
   identifying the transistor characteristics of interest within the netlist associated with the semiconductor chip design; and
   extracting the transistor characteristics of interest from the netlist associated with the semiconductor chip design.

3. The method of claim 1, wherein providing a user interface comprises providing data identifying a location of one or more faults within the cell of the semiconductor chip design within a graphical display overlaying the location of the one or more faults onto a cell layout.

4. The method of claim 1, further comprising:
   generating at least one user interface uniquely identifying at least one transistor and one or more transistor characteristics for the at least one transistor identified within the netlist wherein the user interface uniquely identifying the at least one transistor comprises data uniquely identifying the at least one transistor extracted from the netlist and data identifying the one or more transistor characteristics extracted from the netlist.

5. The method of claim 1, wherein correlating one or more faults detected with one or more transistor characteristics within the netlist comprises looking up a result generated at the one or more output pins of the cell of the semiconductor chip design within a data structure identifying the expected output of the cell of the semiconductor chip design.

6. The method of claim 1, wherein identifying one or more transistor characteristics within a netlist associated with a semiconductor chip design comprises:
   identifying a library cell within the semiconductor chip design; and
   retrieving one or more transistor characteristics for the library cell from a memory storage area.

7. The method of claim 1, further comprising:
   comparing one or more transistor characteristics of the one or more faulty transistors with one or more transistor characteristics extracted from the netlist associated with the semiconductor chip design for other transistors;
   determining whether one or more of the transistor characteristics of the one or more faulty transistors match one or more of the transistor characteristics for at least one of the other transistors;
   determining whether one or more faults detected for the one or more faulty transistors are shared with the at least one of the other transistors upon determining that at least one of the transistor characteristics of the one or more faulty transistors match at least one of the transistor characteristics for the at least one of the other transistors; and
   upon determining at least one of the one or more faults are shared with at least one of the other transistors, identifying the at least one of the other transistors as a faulty transistor within the user interface.

8. A system comprising:
   a memory storing instructions; and
   a processor, coupled with the memory and to execute the instructions, the instructions when executed cause the processor to:
      identify one or more transistor characteristics within a netlist associated with a semiconductor chip design;
      execute an advanced cell-aware fault model for the semiconductor chip design to provide inputs specified within one or more fault test models to input pins of a cell of the semiconductor chip design, wherein the one or more fault test models are identified based at least in part on the one or more transistor characteristics within the netlist associated with the semiconductor chip design and wherein providing the inputs to input pins of the cell causes the cell to generate results at one or more output pins of the cell;

correlate one or more faults detected with one or more transistor characteristics within the netlist based at least in part on the results of the one or more fault test models to identify one or more faulty transistors within the semiconductor chip design; and provide a user interface identifying the one or more faulty transistors within the semiconductor chip design.

9. The system of claim 8, wherein identifying one or more transistor characteristics comprises:

receiving user input of transistor characteristics of interest;

identifying the transistor characteristics of interest within the netlist associated with the semiconductor chip design; and extracting the transistor characteristics of interest from the netlist associated with the semiconductor chip design.

10. The system of claim 8, wherein providing a user interface comprises providing data identifying a location of one or more faults within the cell of the semiconductor chip design within a graphical display overlaying the location of the one or more faults onto a cell layout.

11. The system of claim 8, wherein the processor is further configured to generate at least one user interface uniquely identifying at least one transistor and one or more transistor characteristics for the at least one transistor identified within the netlist wherein the user interface uniquely identifying the at least one transistor comprises data uniquely identifying the at least one transistor extracted from the netlist and data identifying the one or more transistor characteristics extracted from the netlist.

12. The system of claim 8, wherein correlating one or more faults detected with one or more transistor characteristics within the netlist comprises looking up a result generated at the one or more output pins of the cell of the semiconductor chip design within a data structure identifying the expected output of the cell of the semiconductor chip design.

13. The system of claim 8, wherein identifying one or more transistor characteristics within a netlist associated with a semiconductor chip design comprises:

identifying a library cell within the semiconductor chip design; and retrieving one or more transistor characteristics for the library cell from a memory storage area.

14. The system of claim 8, wherein the processor is further configured to determine whether one or more faults detected for a semiconductor chip design are shared with a plurality of transistors within the semiconductor chip design.

15. A non-transitory computer readable medium comprising stored instructions, which when executed by a processor, cause the processor to:

identify one or more transistor characteristics within a netlist associated with a semiconductor chip design;

execute an advanced cell-aware fault model for the semiconductor chip design to provide inputs specified within one or more fault test models to input pins of a cell of the semiconductor chip design, wherein the one or more fault test models are identified based at least in part on the one or more transistor characteristics within the netlist associated with the semiconductor chip design and wherein providing the inputs to input pins of the cell causes the cell to generate results at one or more output pins of the cell;

correlate one or more faults detected with one or more transistor characteristics within the netlist based at least in part on the results of the one or more fault test models to identify one or more faulty transistors within the semiconductor chip design; and provide a user interface identifying the one or more faulty transistors within the semiconductor chip design.

16. The non-transitory computer readable medium of claim 15, wherein identifying one or more transistor characteristics comprises:

receiving user input of transistor characteristics of interest;

identifying the transistor characteristics of interest within the netlist associated with the semiconductor chip design; and extracting the transistor characteristics of interest from the netlist associated with the semiconductor chip design.

17. The non-transitory computer readable medium of claim 15, wherein providing a user interface comprises providing data identifying a location of one or more faults within the cell of the semiconductor chip design within a graphical display overlaying the location of the one or more faults onto a cell layout.

18. The non-transitory computer readable medium of claim 15, further comprising stored instructions, which when executed by a processor, cause the processor to generate at least one user interface uniquely identifying at least one transistor and one or more transistor characteristics for the at least one transistor identified within the netlist wherein the user interface uniquely identifying the at least one transistor comprises data uniquely identifying the at least one transistor extracted from the netlist and data identifying the one or more transistor characteristics extracted from the netlist.

19. The non-transitory computer readable medium of claim 15, wherein correlating one or more faults detected with one or more transistor characteristics within the netlist comprises looking up a result generated at the one or more output pins of the cell of the semiconductor chip design within a data structure identifying the expected output of the cell of the semiconductor chip design.

20. The non-transitory computer readable medium of claim 15, wherein identifying one or more transistor characteristics within a netlist associated with a semiconductor chip design comprises:

identifying a library cell within the semiconductor chip design; and retrieving one or more transistor characteristics for the library cell from a memory storage area.

* * * * *